United States Patent [19]

Hofmann

[11] Patent Number: 5,681,032
[45] Date of Patent: Oct. 28, 1997

[54] ENGINE MOUNT WITH CONTROLLABLE RIGIDITY

[75] Inventor: Manfred Hofmann, Hünfelden, Germany

[73] Assignee: Metzeler Gimetall AG, Breuberg, Germany

[21] Appl. No.: 591,383

[22] Filed: Jan. 25, 1996

[30] Foreign Application Priority Data

Jan. 25, 1995 [DE] Germany ............ 195 02 242.4

[51] Int. Cl.⁶ .................... F16F 13/00; B60K 5/12
[52] U.S. Cl. .................... 267/140.14; 267/140.13
[58] Field of Search ............ 267/140.11, 140.13, 267/141, 141.1, 141.3, 141.4, 140.14, 140.15; 248/562, 632, 636, 638

[56] References Cited

U.S. PATENT DOCUMENTS

| | | | |
|---|---|---|---|
| 4,407,491 | 10/1983 | Kunihiro et al. | 267/140.13 |
| 4,469,316 | 9/1984 | van de Boom et al. | 267/140.13 |
| 4,997,168 | 3/1991 | Kato | 267/140.13 |
| 5,170,998 | 12/1992 | Muramatsu | 267/140.13 |
| 5,205,546 | 4/1993 | Schisler et al. | 267/140.13 |
| 5,284,315 | 2/1994 | Hofmann et al. | |

FOREIGN PATENT DOCUMENTS

| | | | |
|---|---|---|---|
| 004139046 | 6/1993 | Germany | 267/140.13 |
| 4139049 | 6/1993 | Germany | 267/140.13 |

Primary Examiner—Robert J. Oberleitner
Assistant Examiner—Chris Schwartz
Attorney, Agent, or Firm—Herbert L. Lerner; Laurence A. Greenberg

[57] ABSTRACT

An engine mount includes upper and lower bearing plates and a hollow-cylindrical support spring being formed of an elastomer and being fastened between the bearing plates. A cup-shaped housing adjoins the lower bearing plate. An inner hollow chamber is defined by inner wall surfaces of the hollow-cylindrical support spring and of the cup-shaped housing. A transversely extending elastic wall divides the inner hollow chamber into an upper chamber and a lower chamber and has a periphery being clamped. A bolt extending centrally within the inner hollow chamber is joined to the upper bearing plate and to the transversely extending wall. The upper and lower chambers are filled with liquid for additional hydraulic damping, and the elastic wall has an overflow opening formed therein through which the upper and lower chambers communicate. A transversely-extending stop plate has an opening formed therein and is disposed in the cup-shaped housing. A control plate is elastically secured to the cup-shaped housing for controllable placement against the stop plate.

7 Claims, 1 Drawing Sheet

ENGINE MOUNT WITH CONTROLLABLE RIGIDITY

BACKGROUND OF THE INVENTION

Field of the Invention

The invention relates to an engine mount including a hollow-cylindrical support spring being formed of an elastomer and being fastened between two bearing plates; a cup-shaped housing adjoining the lower bearing plate; an inner hollow chamber being defined by inner wall surfaces of the hollow-cylindrical support spring and of the cup-shaped housing; a transversely extending elastic wall dividing the inner hollow chamber into an upper chamber and a lower chamber and being fastened on its periphery; a bolt extending centrally within the inner hollow chamber and being joined to the upper bearing plate and the transversely extending wall; the chambers being filled with liquid for additional hydraulic damping; and the elastic wall having an overflow opening through which the chambers communicate.

One such engine mount is known from German Published, Non-Prosecuted Patent Application DE 41 31 771 A1, corresponding to U.S. Pat. No. 5,284,315. There the elastic support spring exhibits good damping in the acoustical range, especially for structure-borne sound. As a result of the hydraulic damping, low-frequency, high-amplitude oscillations are absorbed by the engine mount. In order to provide high-frequency decoupling, the central bolt is provided with an annular plunger plate, which is disposed in the liquid-filled chamber and effects a reduction in the dynamic rigidity at high frequencies.

In certain driving states of a vehicle it is desirable for the rigidity of such an engine mount to be adapted to requirements. For example, it is desirable to make the static rigidity of the mount soft during idling, while in other driving states a hard setting and additional damping is more advantageous instead.

SUMMARY OF THE INVENTION

It is accordingly an object of the invention to provide an engine mount with controllable rigidity, which overcomes the hereinafore-mentioned disadvantages of the heretofore-known devices of this general type.

With the foregoing and other objects in view there is provided, in accordance with the invention, an engine mount, comprising upper and lower bearing plates; a hollow-cylindrical support spring being formed of an elastomer, being fastened between the bearing plates and having an inner wall surface; a cup-shaped housing adjoining the lower bearing plate and having an inner wall surface; an inner hollow chamber being defined by the inner wall surfaces of the hollow-cylindrical support spring and of the cup-shaped housing; a transversely extending elastic wall dividing the inner hollow chamber into an upper chamber and a lower chamber and having a periphery being clamped; a bolt extending centrally within the inner hollow chamber and being joined to the upper bearing plate and to the transversely extending wall; the upper and lower chambers being filled with liquid for additional hydraulic damping, and the elastic wall having an overflow opening formed therein through which the upper and lower chambers communicate; a transversely-extending stop plate having an opening formed therein and being disposed in the cup-shaped housing; and a control plate being elastically secured to the cup-shaped housing for controllable placement against the stop plate.

Through the use of the structure according to the invention, the rigidity of the engine mount is controllable or shiftable as a function of the position of the control plate. The control plate changes the internal volume of the cup-shaped housing. In a first position, in which the control plate rests on the stop plate and closes off the opening thereof, high rigidity is attained. In this position of the control plate, the engine mount is a passive single-chamber hydraulic mount. In a second position of the control plate, in which the control plate rests on the underside of the cup-shaped housing and thus is remote from the stop plate, the rigidity of the hydraulic mount is reduced, and essentially the entire volume of the cup-shaped housing is available.

In principle, it is possible for the control of the control plate to be provided in such a way that the control plate still has a certain clearance and thus brings about a hydraulic decoupling of small exciter amplitudes.

In accordance with another feature of the invention, the control plate has a periphery with an elastomer ring which is braced form-lockingly between the stop plate and the cup-shaped housing. A form-locking connection is one which connects two elements together due to the shape of the elements themselves, as opposed to a force-locking connection, which locks the elements together by force external to the elements. Suitably, the cup-shaped housing is provided with an annular constriction which serves the purpose of fastening the elastomer ring.

In accordance with a further feature of the invention, the control plate is controllable pneumatically or hydraulically. Instead of controlling with overpressure and relief, it is possible, in principle, to also use reduced pressure and negative pressure. In order to effect a hydraulic decoupling of low exciter amplitudes, the pressure can be adjusted in such a way that the control plate still has a certain clearance.

In accordance with an added feature of the invention, an opening for a control liquid is provided in the cup-shaped housing.

In accordance with an additional feature of the invention, the support spring has radially extending conduits disposed in a plurality of planes that are open on their periphery and have a Venturi-like cross-sectional shape. As the support spring is compressed in the axial direction, opposite walls of a conduit come successively into contact with one another, and the result is a gentle rise in the spring characteristic. However, it is also possible to combine conventional support spring geometries for hydraulic mounts with the control of rigidity according to the invention.

In accordance with a concomitant feature of the invention, the elastic wall has a middle thickened region fixed to the bolt with at least one axially extending overflow opening, and in the radially outer region it has a flexible wall that can be made to bulge outward and which is constructed with reduced thickness but high volumetric rigidity.

In order to attain high-frequency decoupling, the central bolt can be provided, approximately half-way up its height, with an annular, radially protruding plate that leaves a gap of predetermined width from the inner jacket of the hollow-cylindrical support spring being open at the outer periphery of the plate. The rigidity at high frequencies is reduced by the plate disposed in the liquid-filled chamber.

Other features which are considered as characteristic for the invention are set forth in the appended claims.

Although the invention is illustrated and described herein as embodied in an engine mount with controllable rigidity, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
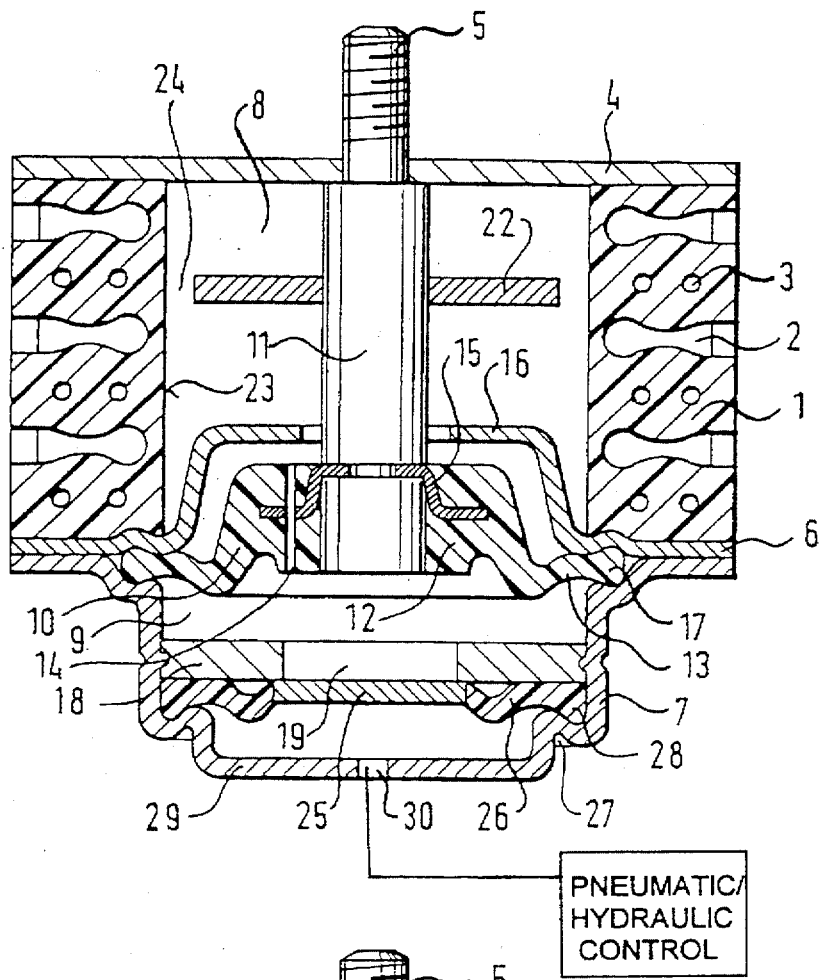
FIG. 1 is a diagrammatic, longitudinal-sectional view of an engine mount according to the invention in a first control position, in which a control plate rests on a stop plate.

Referring now to the figures of the drawing in detail and first, particularly, to FIG. 1 thereof, there is seen a longitudinal section through an engine mount according to the invention, which has a hollow-cylindrical support spring 1 made of an elastomer. The support spring 1 has radial conduits 2 formed therein, which are disposed in a plurality of spaced-apart planes and each of which has a Venturi-like cross section. Conduits 3 being disposed parallel to one another and having a circular cross section are provided between the planes having the radially oriented conduits 2. Through the use of the conduits 2 and 3, when the support spring is compressed in the axial direction, opposite walls of a conduit successively come increasingly into contact with one another, thus providing a gentle rise in the spring characteristic.

The hollow-cylindrical support spring 1 is fastened between upper and lower bearing plates 4, 6. The lower bearing plate 6 is adjoined by a cup-shaped housing 7, which is constructed coaxially with the support spring 1. Inner wall surfaces 23 of the support spring 1 and inner wall surfaces of the cup-shaped housing 7 define an inner hollow chamber, in the center of which a bolt 11 is coaxially disposed. The central bolt 11 has an end being formed as a threaded bolt 5, which penetrates the upper bearing plate 4 and serves the purpose of fixation to a non-illustrated engine. By comparison, the lower bearing plate 6 is constructed for fixation to the body of the vehicle. The lower bearing plate 6 and the cup-shaped housing 7, by comparison, are fixed to the body of the non-illustrated vehicle.

The bolt 11 has an end disposed opposite the threaded bolt 5 which is provided with a transversely extending elastic wall 10, that divides the inner hollow chamber into an upper chamber 8 and a lower chamber 9. The elastic wall 10 has a middle region 12 that is thickened and substantially cylindrical. A fixation of the elastic wall 10 is carried out through the use of a cup-shaped retaining plate 15 that is secured to the bolt 11. The middle region 12 is adjoined in the radial direction by an outer region 13 that has a reduced thickness. The periphery of the transversely extending wall 10 is formed with a thickened peripheral region 17, which is fastened between the lower bearing plate 6 and the cup-shaped housing 7.

Overflow openings 14, which extend in the axial direction and interconnect the chambers 8 and 9, are provided in the middle region 12 of the transversely extending wall 10. From two to four conduit-like overflow openings 14 are suitably distributed over the circumference.

The lower bearing plate 6 is formed with a cup-shaped bulge 16 in the middle region of the engine mount. The cup-shaped bulge 16 surrounds the middle region 12 of the elastic wall 10 in spaced-apart fashion.

A stop plate 18 that extends in the radial direction is provided approximately halfway up the height of and in the interior of, the cup-shaped housing 7. The stop plate is fixed to the inner wall surface of the cup-shaped housing 7 and is sealed off from it. The transversely extending stop plate 18 has an opening 19 in a middle region thereof. The stop plate 18 thus divides the lower chamber 9 into two regions of approximately equal volume.

A control plate 25 which is provided below the stop plate 18 is oriented parallel to the stop plate. The control plate 25 has a peripheral elastomer ring 26, which is form-lockingly fastened between the stop plate 18 and a constriction provided on the cup-shaped housing 7. To that end, the elastomer ring 26 has a thickened peripheral region 28.

The cup-shaped housing 7 is provided with a transversely extending bottom plate 29, in the center of which an opening 30 is provided for a control medium that actuates the control plate 25.

In the region of the upper chamber 8, the bolt 11 is provided with a transversely extending plate 22, which serves the purpose of high-frequency decoupling. The dimensioning of the plate 22 is selected in such a way that a gap 24 is formed between its outer wall surface and the inner wall surface 23 of the support spring 1.

Figure 2:
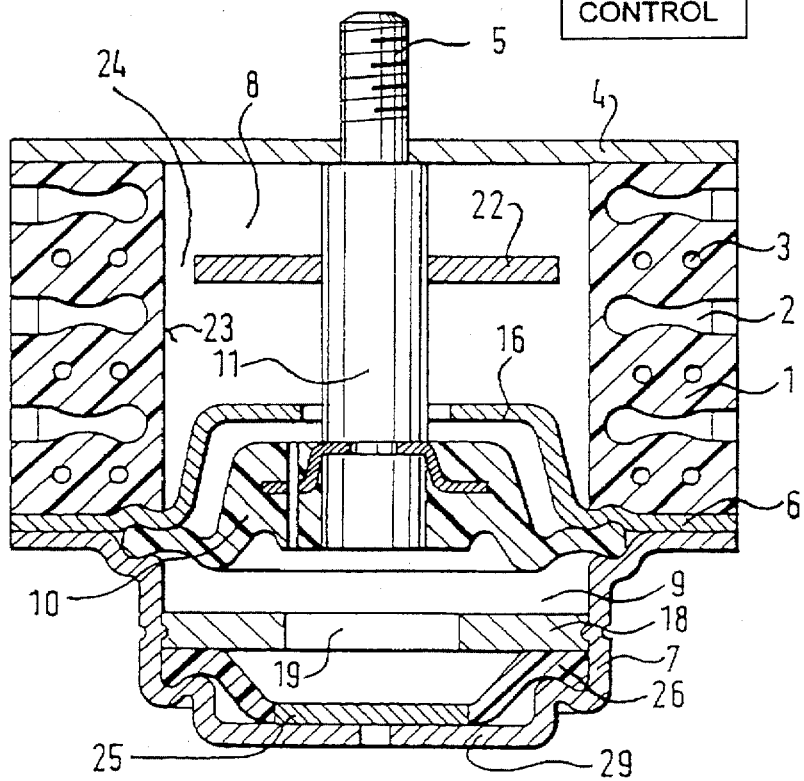
FIG. 2 is another longitudinal-sectional view of the engine mount of FIG. 1 in a second control position, in which the control plate is remote from the stop plate.

As can be seen from FIGS. 1 and 2, the control plate 25 can be controlled or shifted as a function of the prevailing control pressure. In the illustrated exemplary embodiment, the control of the control plate 25 is carried out pneumatically. However, it is also possible in principle for the adjustment of the control plate 25 to be carried out hydraulically.

FIG. 1 shows the control plate 25 in a first position, in which the control plate 25 rests on the stop plate 18 and closes the opening 19. In this position of the control plate 25, the engine mount is one that has high rigidity. The engine mount thus functions like a passive single-chamber hydraulic mount. The static rigidity of the engine mount is determined by the rigidity of the support spring 1 and by the volumetric rigidity of the hydraulic damping. The plate 22 that acts as a plunger effects high-frequency decoupling.

The position of the control plate 25 shown in FIG. 2 is attained by reducing the pressure of the control medium. In this position, the control plate 25 rests on the bottom region 29 of the cup-shaped housing 7. The opening 19 of the stop plate 18 is uncovered, so that the lower chamber 9 has a large volume. Since the pressure in the upper chamber is decreased, the rigidity of the engine mount is reduced. The imposition of pressure on the control plate 25 can be provided in such a way that the control plate 25 still has a certain clearance and thus effects a hydraulic decoupling of low exciter amplitudes.

An engine mount is thus created having a rigidity which is controllable or shiftable as a function of existing driving states. As a result, the engine mount gains a very broad range of applicability.

I claim:

1. An engine mount, comprising:

upper and lower bearing plates;

a hollow-cylindrical support spring being formed of an elastomer, being fastened between said bearing plates and having an inner wall surface;

a cup-shaped housing adjoining said lower bearing plate and having an inner wall surface;

an inner hollow chamber being defined by said inner wall surfaces of said hollow-cylindrical support spring and of said cup-shaped housing;

a transversely extending elastic wall dividing said inner hollow chamber into an upper chamber and a lower chamber and having a periphery being clamped;

a bolt extending centrally within said inner hollow chamber and being joined to said upper bearing plate and to said transversely extending wall;

said upper and lower chambers being filled with liquid for additional hydraulic damping, and said elastic wall having an overflow opening formed therein through which said upper and lower chambers communicate;

a transversely-extending stop plate having an opening formed therein and being disposed in said cup-shaped housing; and a control plate being elastically secured to said cup-shaped housing for controllable placement against said stop plate.

2. The engine mount according to claim 1, wherein said control plate is controllable pneumatically.

3. The engine mount according to claim 2, wherein said cup-shaped housing has an opening formed therein for a control medium.

4. The engine mount according to claim 1, wherein said control plate is controllable hydraulically.

5. The engine mount according to claim 1, wherein said control plate has a periphery and an elastomer ring being form-lockingly braced between said stop plate and said cup-shaped housing.

6. The engine mount according to claim 1, wherein said support spring has radially extending conduits formed therein in a plurality of planes, and said conduits have open peripheries and a cross-sectional shape of Venturi opening.

7. The engine mount according to claim 1, wherein said elastic wall has a thickened middle region being fixed to said bolt and having said overflow opening extending axially therein, and said elastic wall has a radially outer region with a flexible wall for bulging outward, having a reduced thickness and high volumetric rigidity.

* * * * *